United States Patent [19]

Ligon, Jr.

[11] Patent Number: 4,995,582

[45] Date of Patent: Feb. 26, 1991

[54] ANTI-SKID REINFORCING PLATE

[75] Inventor: James T. Ligon, Jr., Almont, Mich.

[73] Assignee: Ligon Brothers Mfg. Co., Almont, Mich.

[21] Appl. No.: 451,863

[22] Filed: Dec. 18, 1989

[51] Int. Cl.$^5$ ............................................. F16B 5/00
[52] U.S. Cl. ................................... 248/544; 248/205.3
[58] Field of Search ..................... 248/205.3, 547, 467, 248/546, 346, 205.4, 544

[56] References Cited

U.S. PATENT DOCUMENTS

| | | | |
|---|---|---|---|
| 3,300,173 | 1/1967 | Kennedy, Jr. | 248/205.3 X |
| 3,365,221 | 1/1968 | Jun et al. | 248/346 X |
| 3,604,673 | 9/1971 | Klein | 248/467 |

FOREIGN PATENT DOCUMENTS 783466  4/1968  Canada .............................. 248/205.3

Primary Examiner—Alvin C. Chin-Shue
Attorney, Agent, or Firm—Miller, Morriss and Pappas

[57] ABSTRACT

A starting and reinforcing tab or plate for fasteners, especially suitable in reference to automobile bodies and trim, comprising a thin walled support plate having a plurality of upper surface upsets or indentations and an adhesive lower surface with a release sheet for activation and exposure of the mastic, and together providing a reinforcing element selectively locatable to steady a drill point for selected penetration of the reinforcing plate and the material to which the tab is applied and enhancing the grip of fasteners drawing the intermediate elements into a compression relationship.

3 Claims, 1 Drawing Sheet

ANTI-SKID REINFORCING PLATE

The present invention relates to an anti-skid reinforcing plate and starter for self-tapping metal screws so as to provide attachment means to an underlying thin wall surface, for example, in metal, which must be penetrated by the self-tapping self-drilling screws. The structure provides means for starting the drill probe point of the self-tapping screws after the plate, with its activated adhesive undersurface, has been secured to a selected surface position on the thin walled underlying wall surface.

In automotive situations where accessories and bracketing must be attached to the sheet metal of body and frame, there is substantial difficulty in the utilizing of the well-known self-tapping self-drilling metal screws since the screw must be passed through the thin walled metal and the self-tapping screws slip, scoring metal surfaces, finishes or interior upholstery or trim and scarring or marring the clean lines of the encountered surfaces. Where painted, the paint is chipped or scratched and where unpainted the drill tip mars, scratches or dents the surface. Repair is costly and time consuming. Frequently center punches are used in preparation of the underlying surfaces and in any reinforcing strips applied to the work face. The center punches provide an upset for application of the drill point of the self-tapping screws but the known reinforcement plates do not retain their position and the single punch prick leaves no optional selection for attachment. In addition the fastening is metal-to-metal and the thin metal is prone to strip the self-cut threads and work free.

The present invention seeks to avoid the difficulties of the known prior art as described by providing an activatable adhesive surface for the upset reinforcing plate for convenient non-skid attachment to selected substrate and by providing the outer surface of the reinforcing plate with pre-scored impressed or embossed pockmarks forming prick-like recesses for non-skid starting of the drill points of the self-tapping self-drilling screws in variously selected locations at anywhere on the plate and an entirely new and useful fastener locating element is provided. The adhesive assures non-skid positive location of the reinforcing plate to underlying boss or panel surface. The resilience in the adhesive pad provides a tension compression sandwich at the point of penetration of the sheet metal by the screw or fastener which results in a more secure support of the screw at the self-cut thread interfaces in reduction of loosening of the screw and in avoidance of stripping of the threads. The consequence is improved fastening with attendant savings in time and nerves to workers applying such attachments to sheet metal constructions, from automobiles to zinc coated structural parts like metal studs, composite metal-to-metal and metal-to-plastic assembly, and like usages.

GENERAL DESCRIPTION

An anti-skid reinforcing plate of selected size to accommodate a particular installation is embossed or upset on one surface as by dimpling or knurling to create small pits in the surface. While metal is the preferred material for the plate, plastic sheet stock and laminar plate stock in various materials may also be used satisfactorily. The lower surface of the plate is coated with an adhesive material and a release paper or cover is positioned over the adhesive. Upon removal of the strip the plate is selectively secured at an approximate fastener location.

In use, the plate (sized and contoured to the particular job) is adhered to the surface which requires attachment in support of, for example, a trim strip, bracket, or hook. Then self-tapping drill tipped screws are easily started by impressing the drill face (for instance, the tip of a self-tapping screw) selectively in any of the dimples or pits of the upper surface and then rotating or driving the screws through the plate and into and through the under surface to which the plate is to be adhered. The reinforcing plate prevents the drill point of the fastener from drifting and upon setting the self-tapping screw, the laminar structure of the reinforcing plate in combination with the adhesive provides a compression cushion to tension and lock the screw against removal by vibration.

This is a substantial improvement in avoidance of damage resulting from slipping of drill bits and screws and the plates may be contoured to conform to the surface receiving the attachment. In addition to the no-skid attachment, the residual resilience in the adhesive or mastic compound combined with the two thicknesses of spaced material, i.e. the plate and the undersurface, results in a very superior and improved grip at the point of use. In addition, an important feature is in allowing adjustment of the location of the screw or piloted threaded fastener to compensate for necessary final looks of the attachments. This provision for final variance is especially desireable in automobiles where in the final interior assembly trim pieces must be attached and adjusted for location without creating difficult slippage and damage problems previously noted in the use of drill-tipped and self-tapping screws.

In The Drawings

FIG. 1 is a perspective view of a non-skid reinforcing plate in accord with the present invention with upper or outer surface overall upset pattern of dimples embossed, formed or impressed thereon. The plate is backed with a mastic or adhesive covered by a sheet or strip of release material as release paper. The release paper is shown partially stripped away and activating or exposing the adhesive material.

FIG. 2 is a side elevation cross section view through the reinforcing plate of FIG. 1 and indicating the laminar character of the anti-skid reinforcing plate.

FIG. 3 shows a somewhat stylized exploded perspective view of the present invention with the self-tapping, self-drilling screw in selected contact with a dimple in the reinforcing plate upper surface and with the screw through a fixture shown in phantom line and with the reinforcing plate adhered to the panel surface in approximate location of the attachment of the fixture. Note that the release cover strip has been removed.

FIG. 4 is a side elevation view of a fixture (shown as a hook) fastened securely to the underlying curvalinear panel at a flat section where the threader fastener is driven through the fixture at the countersink thereof and with the fastener drilled and tapped through the reinforcing panel at a selected upset point and through the underlying panel. The mastic or adhesive possesses resiliency that provides a tension-compression grip upon the panel and the reinforcing plate assuring firm and guidance-fixing-starting of the selected drilling point.

SPECIFIC DESCRIPTION

Figure 1:
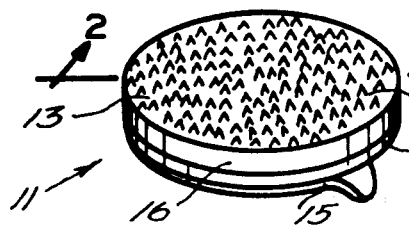

Referring to the drawing and with first particularity to the FIG. 1 thereof, the anti-skid reinforcing plate 11 and starter for drills and for self-tapping metal screws is shown in slightly exaggerated scale to emphasize the laminar construction. The upper and outer surface 12 (as shown) preferably contains impressed upsets creating a plurality of indentations 13 in which a drill or self-tapping screw tip may be selectively located for the initiation of penetration through the plate 11 and through any stock beneath the surface 12 and including a layer of adhesive or mastic material 14 activated by stripping or picking away the release or cover sheet 15. As shown the cover sheet 15 is partially peeled back to expose the adhesive intermediate layer 14 which backs the upper surface 13. The relatively rigid material forming the body 16 upon which the surface 13 is impressed is preferably thin metal as for example mild steel strip or plate stock, aluminum, or relatively rigid plastic sheet material having good acceptance to impressed deformation on the surface 12 and the plate 11 being overall deformable to correspond with an under surface (not shown) of body metal or automotive interior trim wall-backing as will be seen.

Figure 2:
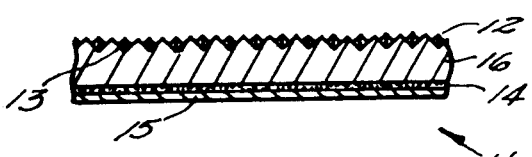
Figure 3:
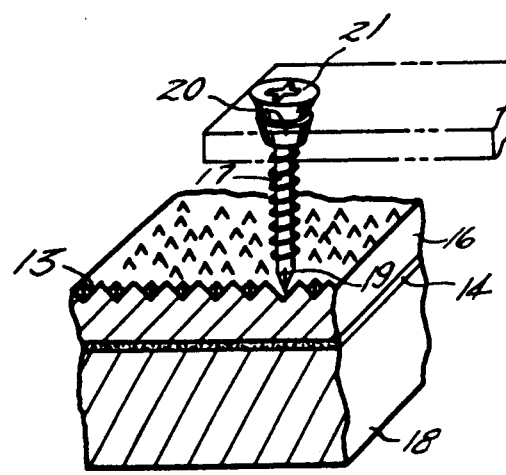

The FIG. 2 more realistically illustrates the upsets or depressions 13 formed in the upper surface 12 of the reinforcing plate 11. The cross section of FIG. 2 shows the surface upset as not penetrating the thickness of material 16. However, in instances of a very thin plate 11, the upsets 13 may be visible on upper and lower surfaces of material 16 of the plate 11. The intermediate layer 14 is the adhesive layer and the lowermost layer is the peelable release paper or sheet 15.

By stripping off the release sheet 15 the plate 11 can be selectively attached in non-skid relationship to a structural undersurface and, by reference to FIG. 2, at penetration a thin strip or fixture 16' in phantom-line may be penetrated by a fastener such as the self-drilling and self-tapping metal screw 17 driven into the underlying structural element 18. The mastic layer 14 bonds to the element 18, the drill portion 19 of the self-drilling and tapping screw 17 impinged selectively in one of the plural depressions 13. As can be appreciated, tapered or conical thrust ring 20 provides a nesting pocket for the screw head 21. The plate 11 thus increases the speed of attachment of the fasteners 17 in avoidance of slip, skid or marring of the undersurface 18 and allows more dimensioned tolerance in final assembly of automobile structure since the location of the fastener 17 is selective in accord with convenience. In fact, the assembly worker simply activates, by peeling away the release layer 15, and sticking plate 11 to the underlayer 18 at an approximate location as desired. When thus attached, the fixtures or trim dictate by providing openings in some tolerance related position on the plate 11.

Figure 4:
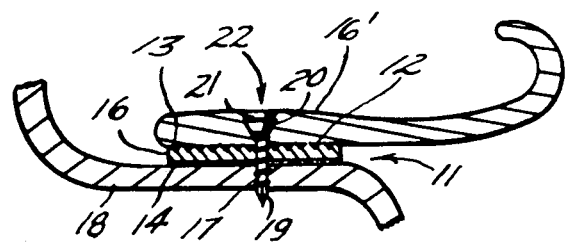
Figure 5:
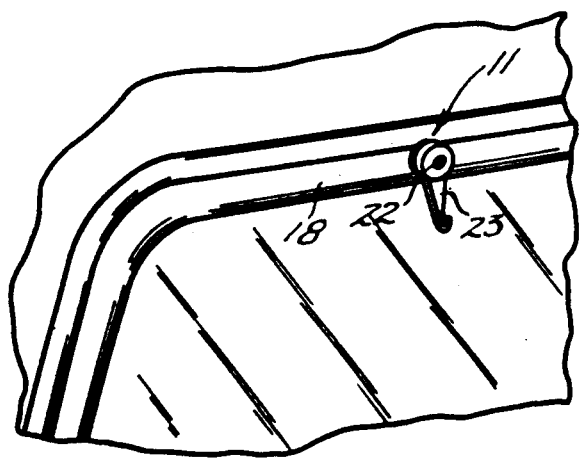
FIG. 5 is a phantom perspective of a fragment of an automobile as between a door and windows and indicating the selected attachment of a convenience hook attached to underlying panel and assisted by the reinforcing plate beneath the fixture.

In FIG. 4, the cross section illustrates a completed attachment in which the activated reinforcing plate 11 is adhered by stripping away the release sheet and sticking the mastic-exposed under-surface 14 to the wall or frame element 18. Then the fastener 17 is passed through the opening 22 in the fixture 16' and the drill tip 19 of the fastener 17 is driven through the plate 11 as held against slippage by the selected of depressions 13. The conical thrust ring 20 locates nestingly in the taper of the countersink of opening 22.

The coathook 23 is located in respect to frame and trim in an automobile body 24 and is spot supported by the anti-skid reinforcing plate 11 as previously described thereby facilitating location, and drilling and tapping through opening 24 and plate 11 into the under surface material 18 aided by the surface upsets described.

Figure 6:
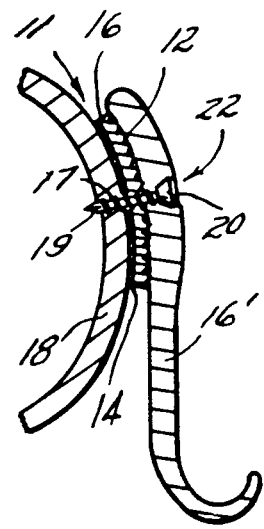
FIG. 6 is a side elevation view through the hook seen in FIG. 5 and indicating that the reinforcing plate of the present invention may include compound curvature and may be adjusted in position by entry of the fastener at any point on the upper surface of the reinforcement plate.

In FIG. 6 a full cross section through the fastening on a curvalinear surface illustrates the amenability of the anti-skid reinforcing plate 11 to be conformed to the surface contours of the element 18 and the element 16' and the plate 11 selectively secured against slip by the adhesive of mastic 14 for selected penetration by a drill or fastening 17, firmed at entry by impingement in one of the depressions 13 in the upper surface of the plate 11. Forming may be by preforming the plates 11. It may also be done with thin stock.

The reinforcing plate 11 substantially advances to art of fastening metal trim to metal boxes and substantially simplifies and avoids damage to surfaces adjacent to required fastener location openings. In a broader sense, the invention is generally an extension of the fastening arts.

Having thus described my invention and the preferred embodiment thereof, those ordinarily skilled in the art will perceive obvious changes, modifications and improvements and such changes, modifications and improvements are intended to be included herein, limited only by the scope of my hereinafter appended claims.

I claim:

1. A reinforcing structure useable in removably securing a fixture to a thin wall sheet surface and comprising; a metal reinforcing plate contoured to match the contour of said thin-walled sheet surface and said reinforcing plate having an outermost surface upset by randomly scattered depressions formed therein selectively locating a penetrating tool; and a resilient adhesive underpad of pressure sensitive adhesive material and a release sheet removable cover to actuate said pressure sensitive adhesive for skid proof engagement with a selected thin wall surface; and one or more self-tapping screws for penetrating said reinforcing plate at selected of said upsets and said thin wall surface under a retarding tension-compression load of the threads by said screws and securing said reinforcement structure against release.

2. In the combination of claim 1 wherein said wherein said surface upsets are impressed into said upper surface of said metal plate.

3. In the combination of claim 2 wherein said surface upsets are rolled on to the metal plate and embossing the metal thereby providing pits in said upper surface upon which a drill tip can be started.

* * * * *